US011643600B2

(12) United States Patent
Zhang et al.

(10) Patent No.: US 11,643,600 B2
(45) Date of Patent: May 9, 2023

(54) LIQUID CRYSTAL MIXTURE AND LIGHT MODULATING DEVICE USING THE SAME

(71) Applicant: Smart Liquid Crystal Technologies Co., Ltd., Suzhou (CN)

(72) Inventors: Hongwei Zhang, Suzhou (CN); Hui Xu, Suzhou (CN); Fei Wang, Suzhou (CN); Jiuzhi Xue, Suzhou (CN)

(73) Assignee: Smart Liquid Crystal Technologies Co., Ltd., Suzhou (CN)

( * ) Notice: Subject to any disclaimer, the term of this patent is extended or adjusted under 35 U.S.C. 154(b) by 204 days.

(21) Appl. No.: 16/756,230

(22) PCT Filed: Nov. 20, 2018

(86) PCT No.: PCT/CN2018/116363
§ 371 (c)(1),
(2) Date: Apr. 15, 2020

(87) PCT Pub. No.: WO2019/101060
PCT Pub. Date: May 31, 2019

(65) Prior Publication Data
US 2021/0198575 A1    Jul. 1, 2021

(30) Foreign Application Priority Data
Nov. 23, 2017    (CN) .......................... 201711184202.6

(51) Int. Cl.
*C09K 19/12*        (2006.01)
*G02F 1/1337*       (2006.01)
(Continued)

(52) U.S. Cl.
CPC .......... *C09K 19/12* (2013.01); *C09K 19/2007* (2013.01); *G02F 1/13756* (2021.01);
(Continued)

(58) Field of Classification Search
CPC .................................................. C09K 19/586
See application file for complete search history.

(56) References Cited

U.S. PATENT DOCUMENTS 9,752,075 B2    9/2017    Tuffin et al.
10,087,370 B2  10/2018    Tuffin et al.
(Continued)

FOREIGN PATENT DOCUMENTS

CN    100545713 C    9/2009
CN    103619992 A    3/2014
(Continued)

OTHER PUBLICATIONS

Nemitz, I. R., Ferris, A. J., Lacaze, E., & Rosenblatt, C. (2016). Chiral oily streaks in a smectic-A liquid crystal. Soft matter, 12(31), 6662-6668. https://doi.org/10.1039/c6sm01238h (Year: 2016).*

*Primary Examiner* — Chanceity N Robinson
(74) *Attorney, Agent, or Firm* — Hoffmann & Baron, LLP

(57) ABSTRACT

A liquid crystal mixture applied in light modulating devices includes at least one compound selected from the group of compounds of formula I, at least one compound selected from the group of compounds of formula II and/or formula III, and at least one chiral compound. A light modulating device includes the liquid crystal mixture, where the light modulating device has reduced haze in the transparent state while increased opacity in the light scattering state.

$$R_1\text{-}MG_1\text{-}X\text{-}MG_2\text{-}R_2 \qquad \text{I}$$

$$A_1\text{---}(\!\!-\!H_1\!\!-\!\!)_{\overline{k}}\, H_2\text{---}A_2 \qquad \text{II}$$

$$A_3\text{---}(\!\!-\!H_3\!\!-\!B_1\!\!-\!\!)_{\overline{m}}\, H_4\text{---}B_2\!\!-\!\!)_{\overline{n}}\, H_5\!\!-\!\!)_{\overline{o}}\, A_4 \qquad \text{III}$$

7 Claims, 3 Drawing Sheets

(51) Int. Cl.
*G02F 1/137* (2006.01)
*C09K 19/20* (2006.01)
*C09K 19/04* (2006.01)
*C09K 19/18* (2006.01)
*C09K 19/30* (2006.01)

(52) U.S. Cl.
CPC .......... *G02F 1/133742* (2021.01); *C09K 2019/0448* (2013.01); *C09K 2019/122* (2013.01); *C09K 2019/123* (2013.01); *C09K 2019/183* (2013.01); *C09K 2019/2071* (2013.01); *C09K 2019/3016* (2013.01); *C09K 2323/00* (2020.08)

(56) References Cited

U.S. PATENT DOCUMENTS

| | | | |
|---|---|---|---|
| 10,495,791 | B2 | 12/2019 | Saitoh et al. |
| 2014/0232977 | A1 | 8/2014 | Adlem et al. |
| 2015/0175886 | A1* | 6/2015 | Tuffin ................ C09K 19/0258 |
| | | | 252/299.66 |
| 2017/0343847 | A1 | 11/2017 | Fiebranz et al. |
| 2017/0351130 | A1* | 12/2017 | Gorecki ............... C09K 19/588 |
| 2018/0004045 | A1* | 1/2018 | Chen .................... G02F 1/1393 |
| 2018/0305619 | A1* | 10/2018 | Wilkes ............... G02F 1/13718 |

FOREIGN PATENT DOCUMENTS

| | | |
|---|---|---|
| CN | 104321410 A | 1/2015 |
| CN | 104560059 A | 4/2015 |
| CN | 105745307 A | 7/2016 |
| CN | 106324884 A | 1/2017 |
| CN | 107003578 A | 8/2017 |
| CN | 107075370 A | 8/2017 |
| CN | 107111042 A | 8/2017 |
| CN | 107209426 A | 9/2017 |
| WO | 2017/067630 A1 | 4/2017 |

* cited by examiner

LIQUID CRYSTAL MIXTURE AND LIGHT MODULATING DEVICE USING THE SAME

CROSS-REFERENCE TO RELATED APPLICATIONS

This application is the National Stage of International Application No. PCT/CN2018/116363, filed Nov. 20, 2018, which claims the benefit of Chinese Application No. 201711184202.6, filed Nov. 23, 2017, the contents of which is incorporated by reference herein.

TECHNICAL FIELD

The present invention relates to a liquid crystal mixture, and more particularly, to a liquid crystal mixture applied to a light modulating device. The invention also relates to a light modulating device comprising the liquid crystal mixture.

BACKGROUND OF THE INVENTION

As one of the most common building materials, light modulating glass has the traditional features of safe, durable, clear, transparent, etc. Additionally, it has a function of adjusting the light transmittance as desired to providing the glass some new features, such as blocking UV or IR light and increasing privacy. Among all technologies applied to the light modulating glass, liquid crystal based technology is one of the rapidly developing technologies.

Commonly used liquid crystal based smart glass adopts the polymer dispersed liquid crystal (PDLC) technology, wherein PDLC is formed by using nematic liquid crystals and polymers, and by controlling the alignment state of the liquid crystal, the PDLC can switch between a transparent state and a scattering state to realize electronically controlled dimming, as disclosed in patent CN100545713C and patent application CN106324884A. PDLC smart glass can achieve visual blocking and transmission, resulting in good shielding, privacy and isolation. However, PDLC smart glass has problems of high haze in the transparent state, angularly dependence, high driving voltage and large power consumption.

Bimesogenic compounds refer to liquid crystal compounds containing two mesogenic groups, that is, two groups capable of inducing a liquid crystal phase. Due to their special structure, bimesogenic compounds can induce a second nematic phase (twist-bend nematic phase) in a nematic liquid crystal mixture, thereby obtaining a relatively high splay elastic constant $K_{11}$, a relatively low bending elastic constant $K_{33}$, and a low flexural electric coefficient. As a result, the bimesogenic compounds are commonly used in flexoelectric liquid crystal devices.

Therefore, there remains a need for a liquid crystal mixture that allows the light modulating device to decrease haze in the transparent state while maintain a high haze in the light scattering state, thereby achieving efficiently dimming.

SUMMARY OF THE INVENTION

In order to overcome the above mentioned issues, one objective of the present invention is to provide a liquid crystal mixture applied in light modulating devices, comprising:

at least one compound selected from the group of compounds of formula I $$R_1\text{-}MG_1\text{-}X\text{-}MG_2\text{-}R_2 \quad \text{I;}$$

at least one compound selected from the group of compounds of formula II and/or formula III

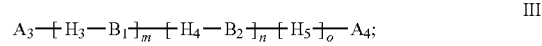

and at least one chiral compound, wherein $R_1$ and $R_2$ each independently denote —H, —F, —Cl, —CN, —NCS or a chain alkyl group with 1 to 25 C atoms where one or more H atom may be independently substituted by halogen or CN and one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF— or —C≡C— in such a manner that two —O— are not directly adjacent to one another, MG$_1$ and MG$_2$ each independently denote a mesogenic group, X is a straight-chain or branched alkyl group with 1, 3 or 5-40 C atoms where one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF—, —C≡C— or —CH(CN)— in such a manner that no two —O— are adjacent to one another or no two groups selected from —OCO—, —SCO—, —OCOO—, —COS—, —COO— and —CH=CH— are adjacent to each other, H$_1$, H$_2$, H$_3$, H$_4$ and H$_5$ each independently denote a ring structure selected from the group

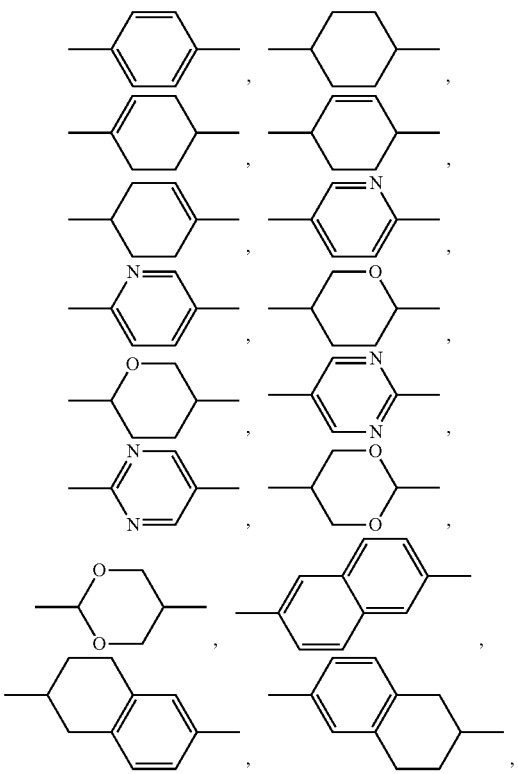

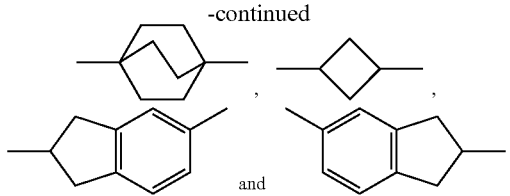

where one or more H atoms may be independently substituted by halogen, a alkyl group with 1-10 C atoms or a ester group, $B_1$ and $B_2$ each independently denote —COO—, —OCO—, —CF$_2$O—, —OCF$_2$—, —CH$_2$O—, —OCH$_2$—, —C≡C—, —CH=CH—, —CF$_2$CF$_2$—, —CF=CF—, a single bond or —(CH$_2$)$_a$— where a is a even number between 2-10, $A_1$, $A_2$, $A_3$ and $A_4$ each independently denote —CN, —F, —Cl, —NCS, —OCF$_3$, —CF$_3$ or a chain alkyl group with 1-25 C atoms where one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF— or —C≡C—, k is 1, 2, 3 or 4, m is 0, 1 or 2, n is 1, 2 or 3, o is 1 or 2, and m+n+o is no more than 5.

In some preferred embodiments, the chiral compound may cause nematic liquid crystal molecules helically twist to form chiral nematic liquid crystal, that is, cholesteric liquid crystal. In more preferred embodiments, the chiral compound includes R01, R02, R03, R04, R05, R06, L01, L02, L03, L04, L05 and other chiral compound commonly used in liquid crystal.

In a preferred embodiment, the compounds of formula I is 1%-90% by weight of the liquid crystal mixture. In a more preferred embodiment, the compounds of formula I is 10%-50% by weight of the liquid crystal mixture.

In some preferred embodiments, the mesogenic group is selected from the group of formula IV $$—H_6—\left[B_3—H_7\right]_p—\left[B_4—H_8\right]_q—\left[B_5—H_9\right]_r—$$ IV wherein, $H_6$, $H_7$, $H_8$ and $H_9$ each independently denote a ring structure selected from the group of

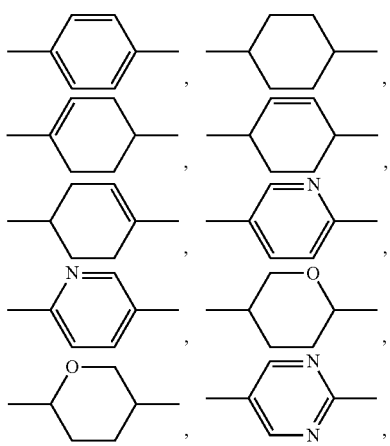

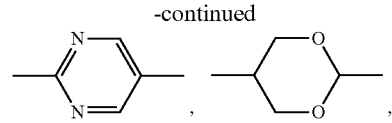

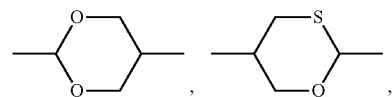

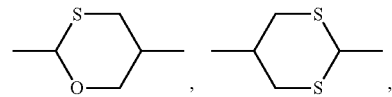

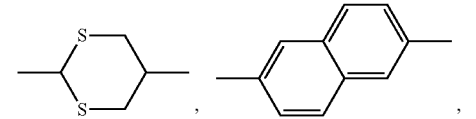

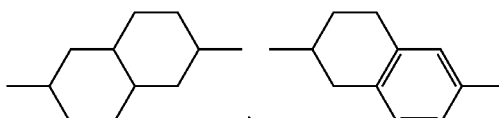

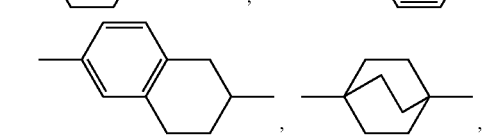

wherein 1-4 H atoms of the ring structures may be independently substituted by halogen, CN or a chain alkyl group with 1-7 C atoms where at least one —CH$_2$— may be replaced by —CHO—, —CO—, —COO— or —OCO— and at least one H atom may be substituted by F or Cl, $B_3$, $B_4$ and $B_5$ each independently denote —COO—, —OCO—, —OCOO—, —OCH$_2$—, —CH$_2$O—, —CF$_2$O—, —(CH$_2$)$_2$—, —(CH$_2$)$_4$—, —C≡C—, —CH=CH—, —CF$_2$CF$_2$—, —CF=CF—, —CH=CH—OCO—, —OCO—CH=CH— or a single bond, p, q and r is 0 or 1.

In some preferred embodiments, $R_1$ and $R_2$ each independently denote —F, —Cl, —CN, —OCF$_3$, —CF$_3$ or an unsubstituted chain alkyl group with 1-25 C atoms.

In some preferred embodiments, $A_1$ and $A_2$ each independently denote —CN, —F, —Cl, —NCS, —OCF$_3$, —CF$_3$ or a chain alkyl group with 2-15 C atoms. In more preferred embodiments, $A_1$ and $A_2$ each independently denote —CN, —F, —Cl, —NCS, —OCF$_3$, —CF$_3$ or a chain alkyl group with 2-8 C atoms.

In some preferred embodiments, $A_3$ and $A_4$ each independently denote —CN, —F, —Cl, —NCS, —OCF$_3$, —CF$_3$ or a chain alkyl group with 2-15 C atoms. In more preferred embodiments, $A_1$ and $A_2$ each independently denote —CN, —F, —Cl, —NCS, —OCF$_3$, —CF$_3$ or a chain alkyl group with 2-4 C atoms.

In some preferred embodiments, X is selected of formula V
where $Y_1$ and $Y_2$ each independently denote —COO—, —OCO—, —O—, —CH=CH—, —$CF_2O$—, —$OCF_2$—, —$CF_2CF_2$— or a single bond, and s is a odd number between 3-13.
In some preferred embodiments, the compound of formula I is selected from the group of compounds I-1 to I-23:
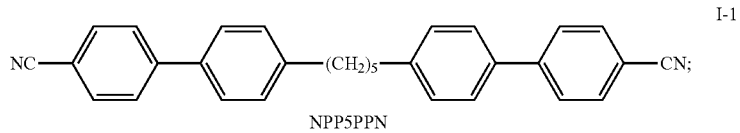
I-1
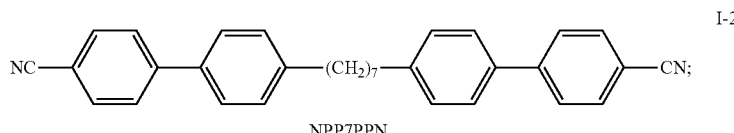
I-2
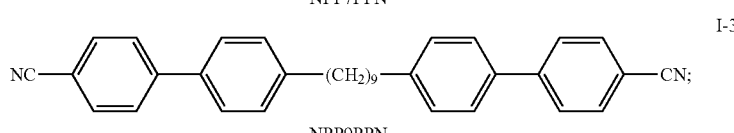
I-3
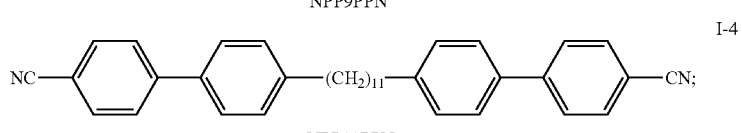
I-4
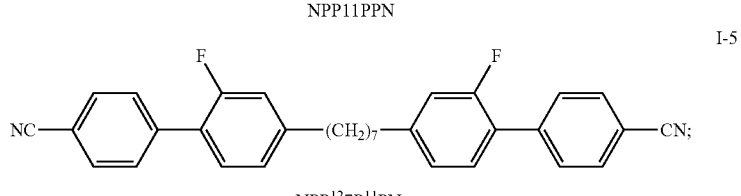
I-5
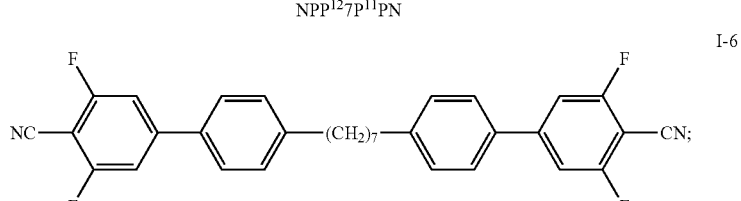
I-6
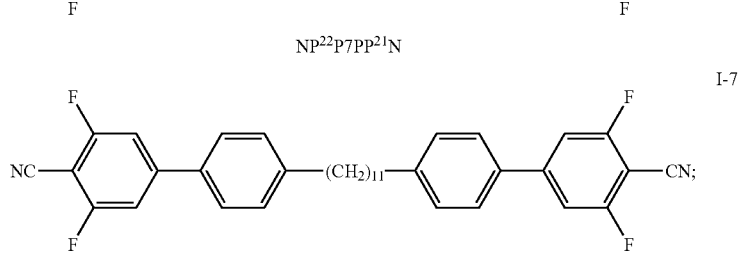
I-7
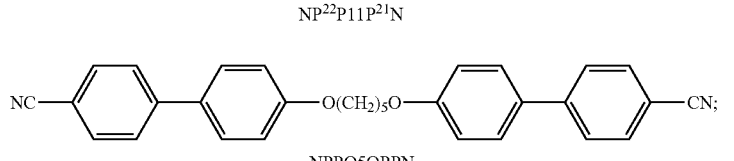
I-8
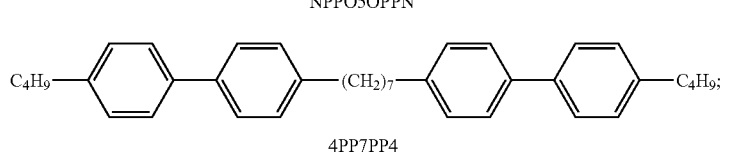
I-9

-continued
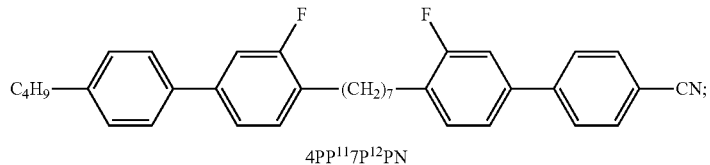
I-10
4PP117P127PN
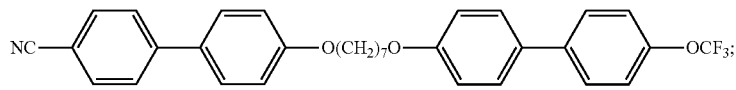
I-11
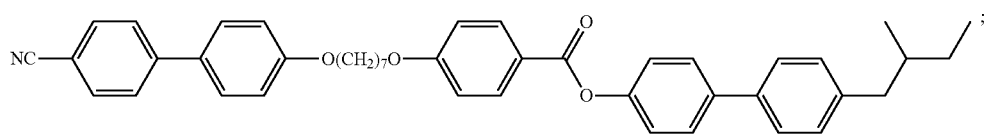
I-12
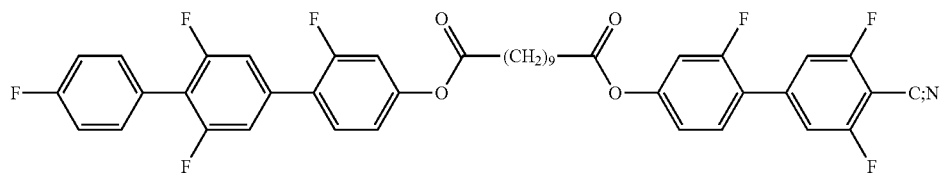
I-13
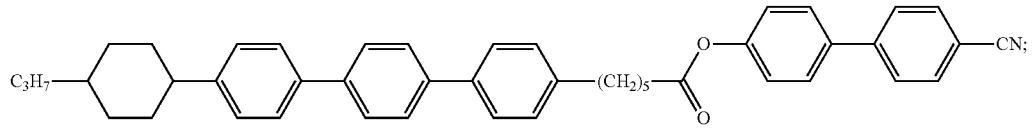
I-14
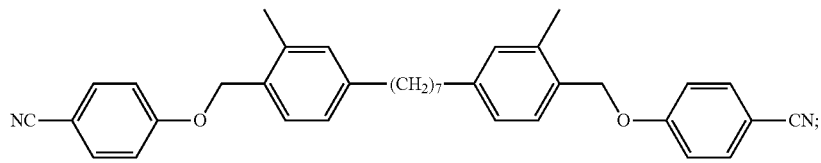
I-15
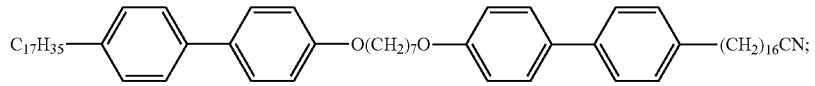
I-16
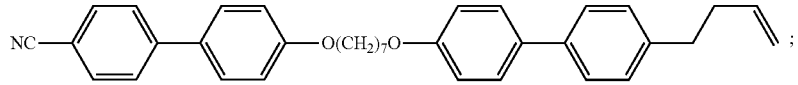
I-17
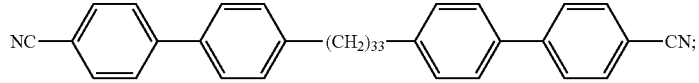
I-18
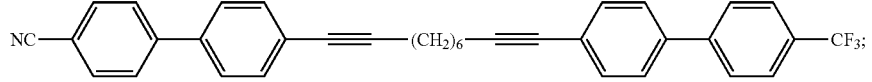
I-19
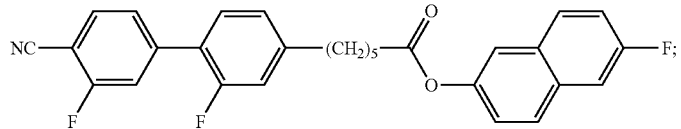
I-20
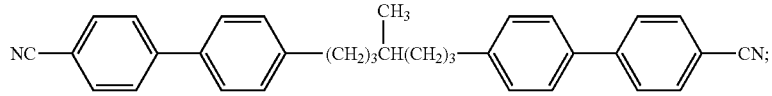
I-21

In some embodiments, the compound of formula I is further selected from the group of compounds I-1 to I-10.

In some preferred embodiments, the compound of formula II is selected from the group of compounds II-1 to II-15:

II-1
2PPN

II-2
4PPN

II-3
5PPN

II-4
7PPN

II-5
3OPPN

II-6
5OPPN

II-7
6OPPN

II-8
8OPPN

II-9
5HPPN

II-10
5PPPN

II-11

II-12

II-13

II-14

II-15

In some embodiments, the compound of formula II is further selected from the group of compounds II-1 to II-10.

In some preferred embodiments, the compound of formula III is selected from the group of compounds III-1 to III-10.

III-1
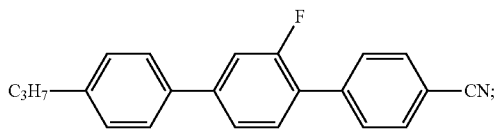
3PP<sup>11</sup>PN

III-2
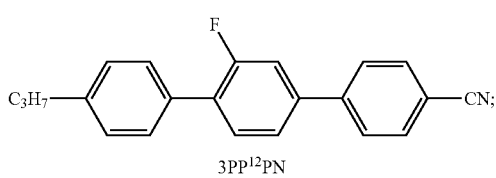
3PP<sup>12</sup>PN

III-3
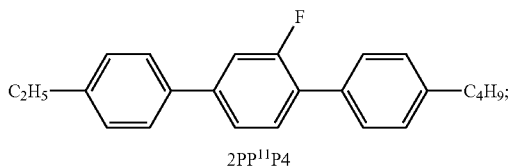
2PP<sup>11</sup>P4

III-4
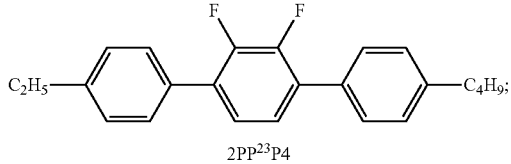
2PP<sup>23</sup>P4

III-5
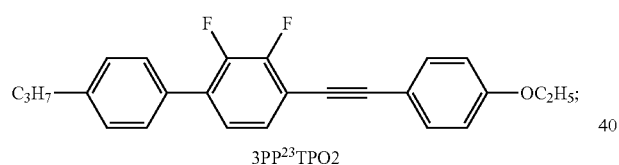
3PP<sup>23</sup>TPO2

III-6
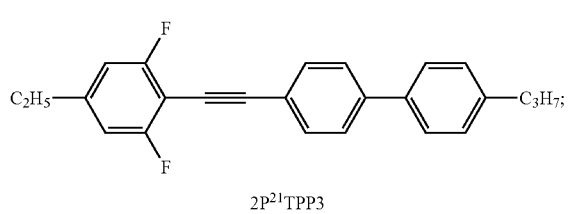
2P<sup>21</sup>TPP3

III-7
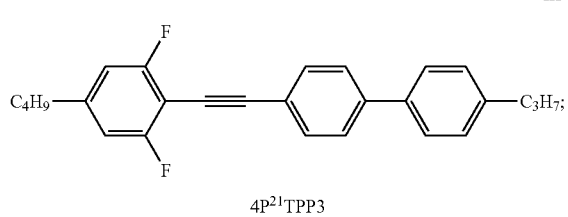
4P<sup>21</sup>TPP3

III-8
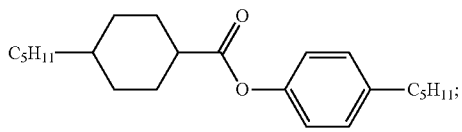

III-9
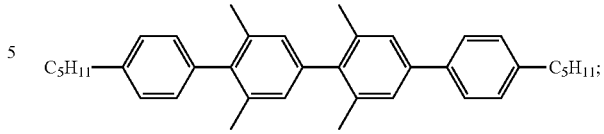

III-10
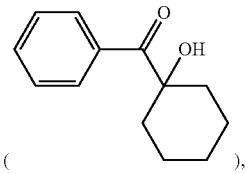 [SMILES: O=C(c1ccccc1)C1(O)CCCCC1]

In some embodiments, the compound of formula III is further selected from the group of compounds III-1 to III-7.

In some preferred embodiments, the liquid crystal mixture further comprises at least one polymerizable monomer, wherein the polymerizable monomer is photo-initiated monomer, including acrylate type and vinyl ether type, such as PM001 or UV-curing adhesive NOA65; or heat-initiated monomer, such as epoxy resin.

In some preferred embodiments, the liquid crystal mixture further comprises at least one polymerization initiator, such as photo initiator 184

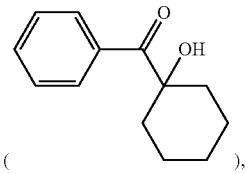 [SMILES: O=C(c1ccccc1)C1(O)CCCCC1]

( ), photo initiator

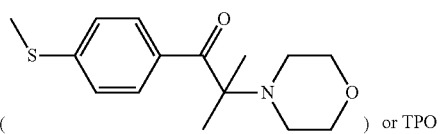 or TPO

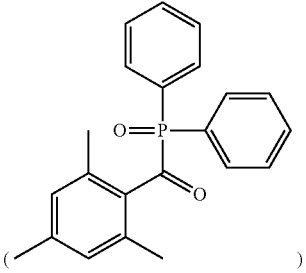

( )

Another objective of the present invention is to provide a light modulating device containing the liquid crystal mixture, which includes two stable states: the transparent state where substantially all the incident light go through and the light scattering state where substantially all the incident light is scattered, wherein the transparent state and the light scattering state may be switched by applying electrical field.

Preferably, the haze of the transparent state is no more than 15%. More preferably, the haze of the transparent state is no more than 7%.

Preferably, the haze of the light scattering state is no less than 80%. More preferably, the haze of the light scattering state is no less than 88%.

The invention provides a liquid crystal mixture applicable to a light modulating device. By inducing bimesogenic compound, the elastic constant of the liquid crystal system is adjusted, the uniformity of the planar arrangement of the liquid crystal mixture is improved, the texture defect is decreased, and thereby the haze of the light modulating device in the transparent state reduces while the haze in the light scattering state increases.

BRIEF DESCRIPTION OF THE DRAWINGS

These and other features and advantages of the present invention will be better understood by reference to the following detailed description of an illustrative embodiment of the present disclosure when read in conjunction with the accompanying drawings, wherein.

DETAILED DESCRIPTION OF THE INVENTION

Figure 1:
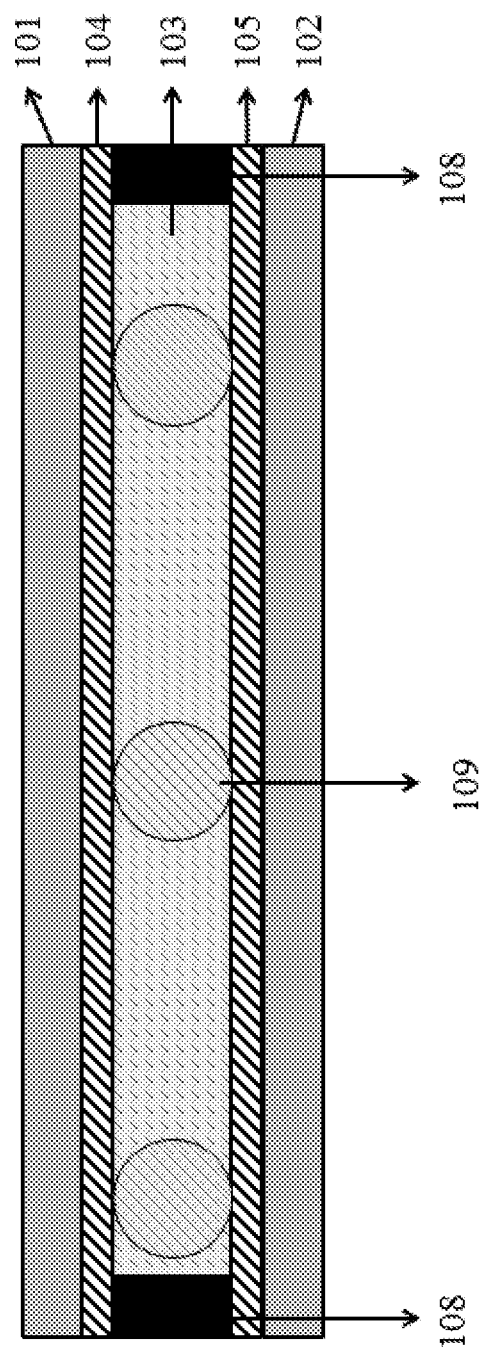
FIG. 1 is a schematic, illustrative view of the structure of the light modulating device according to one embodiment.

The following description of the disclosed embodiments is provided in detail to enable any person skilled in the art to fully understand the present invention. However, it will be apparent to those skilled in the art to readily make or use the present invention without these specific details. In other examples, well-known structures and devices are shown in the block diagram. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

The component used in following examples can be either synthesized through a known method or purchased from markets. These synthetic methods are conventional and each of the obtained liquid crystal compounds has been tested to meet the standards of electronic compounds.

A liquid crystal mixture was prepared in accordance with the ratio specified in the following examples. The preparation is carried out in accordance with a conventional method in the art. In detail, each component is weighed according to its corresponding mass percentage, and placed in a glass bottle. After a magnetic stirring bar is added, the bottle is placed on a heating magnetic stirrer, and the liquid crystal mixture is heated and stirred until completely melting to form an isotropic transparent solution. The temperature at this point has reached the clear point of the liquid crystal mixture. If the liquid crystal mixture contains a light-sensitive polymerizable monomer, after the polymerizable monomer is added, the liquid crystal mixture must be heated to the clear point in the dark. The liquid crystal mixture continues to be heat in the temperature for 30 minutes to ensure uniform mixing, and then the liquid crystal continues to be stirred for another 2 hours.

After that, the uniformly mixed liquid crystal mixture is poured into an empty liquid crystal cell prepared according to various design requirements by a vacuum-filled method, and then the cell is sealed by a UV adhesive, forming a light modulating device. The light modulating device has two stable states: a transparent state and a light scattering state. In the transparent state, the chiral nematic liquid crystal (cholesteric liquid crystal) molecules are substantially aligned parallel to the device substrate, and the helical axis thereof is perpendicular to the device substrate to form the planar texture of cholesteric liquid crystal. In this state, the incident light transmits through the light modulating device substantially unaffected. While in the light scattering state, the cholesteric liquid crystal molecules form a focal conic texture, and the incident light is substantially scattered, causing large haze. By selecting a suitable driving voltage, the light modulating device may be switched between the transparent state and the light scattering state, where the haze is measured using a WGT-S type haze meter to determine its optical performance.

The structure of the light modulating device is shown in FIG. 1, wherein the upper transparent substrate 101 and the lower transparent substrate 102 may be made of a hard material (such as transparent glass) or a flexible material (such as PET). The liquid crystal layer 103 is disposed between the upper transparent substrate 101 and the lower transparent substrate 102, which contains the liquid crystal mixture. The first electrode 104 and the second electrode 105 are disposed between the upper transparent substrate 101 and the liquid crystal layer 103 and between the lower transparent substrate 102 and the liquid crystal layer 103. The electrodes may be corresponding ITO plating layers. A sealant 108 is applied to seal the liquid crystal mixture inside the light modulating device. The thickness of the liquid crystal layer 103 can be controlled by the size of the spacer 109 dispersed in the liquid crystal layer 103.

Figure 2:
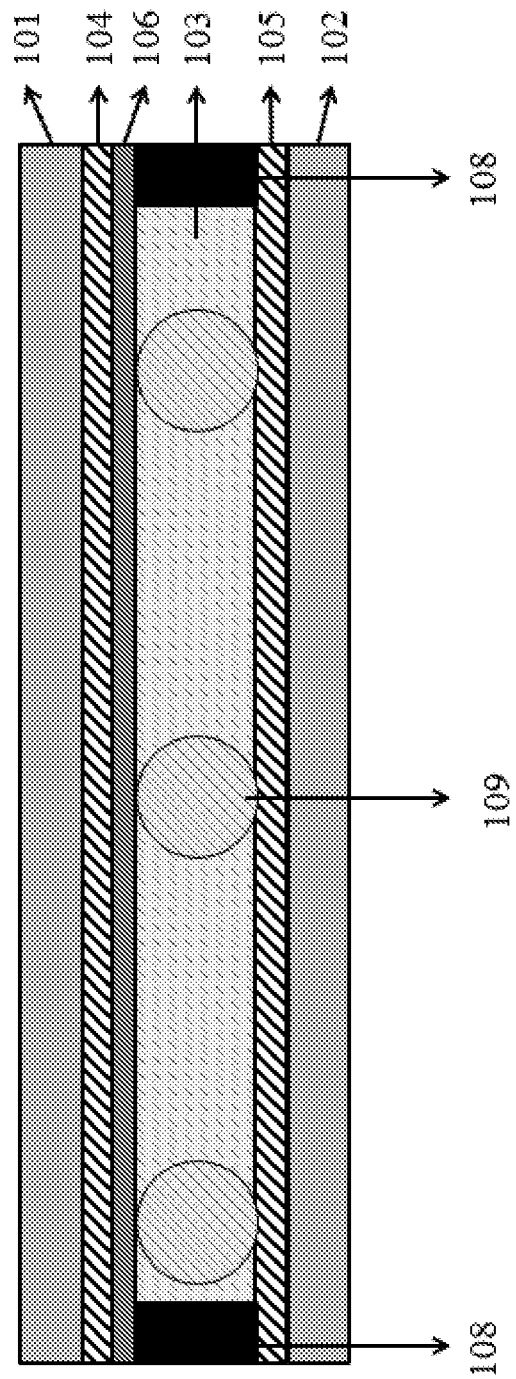
FIG. 2 is a schematic, illustrative view of the structure of the light modulating device according to another embodiment.
Figure 3:
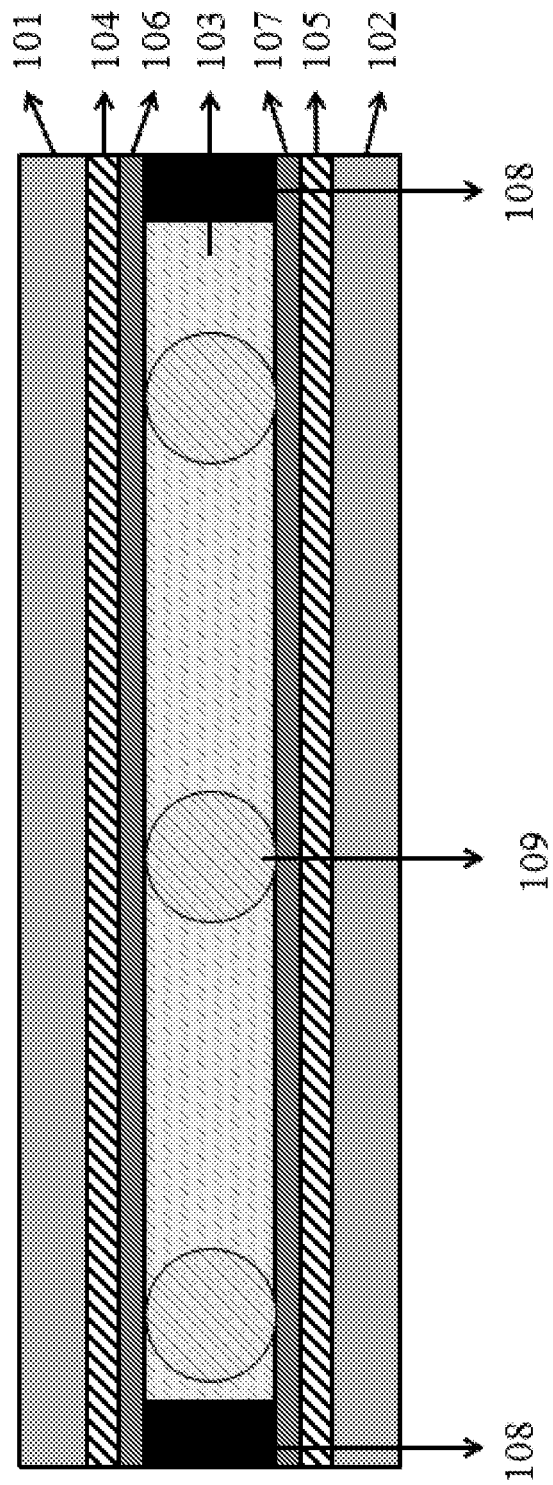
FIG. 3 is a schematic, illustrative view of the structure of the light modulating device according to another embodiment.

In some embodiments, a first alignment layer 106 may be disposed between the first electrode 104 and the liquid crystal layer 103, as shown in FIG. 2. The alignment layer 106 serves to align the liquid crystal molecules in the liquid crystal layer 103 in a predetermined pattern. The type of the alignment layer 106 includes IPS, TN, STN, and so on, such as an IPS type alignment film made of an orientation agent DL-2194, and a TN type alignment film made of an orientation agent DL-2590 and an STN type alignment film made of an orientation agent DL-3260, produced by Shenzhen Dalton Electronic Materials Co., Ltd. In some embodiments, as shown in FIG. 3, a second alignment layer 107 is further disposed between the second electrode 105 and the liquid crystal 103.

In the following examples, the group structures of the liquid crystal molecules are represented by the codes listed in Table 1, and the codes and structures of some additives are listed in Table 2. The ratios all refer to mass percentages, and the alignment layer or the transparent substrate located on opposite sides of the liquid crystal layer 103 is rubbed in an anti-parallel manner.

TABLE 1

| the code for groups of liquid crystal | |
| --- | --- |
| Code | Group structure |
| E | (—C(=O)—O—) |
| Ei | (—O—C(=O)—) |

TABLE 1-continued the code for groups of liquid crystal

| Code | Group structure |
| --- | --- |
| H | (cyclohexane-1,4-diyl) |
| O | —O— |
| P | (1,4-phenylene) |
| P$^{11}$ | (3-fluoro-1,4-phenylene) |
| P$^{12}$ | (2-fluoro-1,4-phenylene) |
| P$^{21}$ | (3,4-difluoro-1,4-phenylene) |
| P$^{22}$ | (2,6-difluoro-1,4-phenylene) |
| P$^{23}$ | (2,3-difluoro-1,4-phenylene) |
| T | —C≡C— |
| F | —F |
| N | —C≡N |
| n or m | —C$_n$H$_{2n+1}$ or —C$_m$H$_{2m+1}$ | where, if n or m is 3, the group is —C$_3$H$_7$.

TABLE 2

The code and structure of other additives

| Code | Structure |
| --- | --- |
| R01 | (2-methylbutyl-biphenyl-CN) |
| R02 / L02 | (C$_6$H$_{13}$—O—phenyl—C(O)O—phenyl—C(O)O—CH(CH$_3$)C$_6$H$_{13}$) |
| R03 / L03 | (C$_5$H$_{11}$—cyclohexyl—phenyl—C(O)O—CH$_2$—CH(Ph)—O—C(O)—phenyl—cyclohexyl—C$_5$H$_{11}$) |
| R04 / L04 | (C$_3$H$_7$—cyclohexyl—cyclohexyl—(2,6-difluorophenyl)—O—CH(CH$_3$)C$_6$H$_{13}$) |

TABLE 2-continued

The code and structure of other additives

| Code | Structure |
|---|---|
| R05<br>L05 | 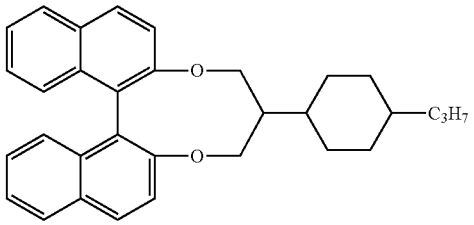 |
| R06 | 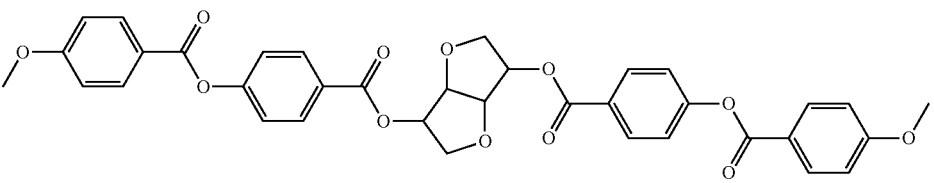 |
| PM001 | 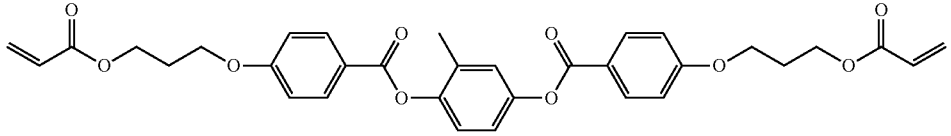 [SMILES: C=CC(=O)OCCCOc1ccc(C(=O)Oc2ccc(OC(=O)c3ccc(OCCCOC(=O)C=C)cc3)c(C)c2)cc1] |

COMPARATIVE EXAMPLE

TABLE 3 formula of liquid crystal mixture

| Component | Ratio/% |
|---|---|
| 2PPN | 7.6 |
| 5PPN | 21.8 |
| 5OPPN | 16.8 |
| 6OPPN | 7.9 |
| 3PP11PN | 16.8 |
| 5HPPN | 8.9 |
| 5PPPN | 4.2 |
| R01 | 16.0 |
| Total | 100 |

TABLE 4 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 76.6 | 66.4 |
| FIG. 1 | 20 | None | 78.9 | 68.9 |
| FIG. 2 | 16 | TN | 67.8 | 27.8 |
| FIG. 3 | 16 | TN | 61.6 | 24.5 |
| FIG. 3 | 20 | TN | 65.3 | 26.7 |
| FIG. 3 | 20 | IPS | 64.3 | 25.6 |

Example 1

TABLE 5 formula of liquid crystal mixture

| Component | Ratio/% |
|---|---|
| NPP7PPN | 25.0 |
| 2PPN | 4.9 |
| 5PPN | 14.0 |
| 5OPPN | 10.8 |
| 6OPPN | 5.1 |
| 3PP11PN | 10.8 |
| 5HPPN | 5.7 |
| 5PPPN | 2.7 |
| R01 | 16.0 |
| NPPO5OPPN | 5.0 |
| Total | 100 |

TABLE 6 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 88.8 | 3.3 |
| FIG. 1 | 16 | None | 87.3 | 3.2 |

Example 2

TABLE 7 formula of liquid crystal mixture

| Component | Ratio/% |
|---|---|
| NPP7PPN | 28.0 |
| 2PPN | 5.0 |
| 5PPN | 14.6 |
| 5OPPN | 11.2 |
| 6OPPN | 5.3 |
| 3PP[11]PN | 11.2 |
| 5HPPN | 5.9 |
| 5PPPN | 2.8 |
| R01 | 16.0 |
| Total | 100 |

TABLE 8 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 89.0 | 5.2 |
| FIG. 3 | 16 | TN | 86.0 | 1.9 |
| FIG. 3 | 16 | IPS | 88.0 | 2.1 |
| FIG. 1 | 20 | None | 91.0 | 5.5 |

Example 3

TABLE 9 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP[12]PN | 10.8 |
| 5HPPN | 5.7 |
| 5PPPN | 2.7 |
| R01 | 16.0 |
| NPP7PPN | 30.0 |
| Total | 100 |

TABLE 10 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 89.0 | 1.9 |
| FIG. 3 | 16 | TN | 87.0 | 1.5 |
| FIG. 3 | 16 | IPS | 87.0 | 1.4 |
| FIG. 1 | 20 | None | 90.5 | 2.0 |

Example 4

TABLE 11 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP[11]PN | 10.8 |
| 5HPPN | 5.7 |
| 5PPPN | 2.7 |
| R01 | 18.0 |
| NPP9PPN | 10.0 |
| NPP7PPN | 18.0 |
| Total | 100 |

TABLE 12 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.5 | 1.8 |
| FIG. 3 | 16 | TN | 88.2 | 1.7 |
| FIG. 3 | 16 | IPS | 87.2 | 1.5 |
| FIG. 1 | 20 | None | 91.3 | 2.1 |

Example 5

TABLE 13 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP[11]PN | 10.8 |
| 5HPPN | 5.7 |
| 5PPPN | 2.7 |
| R01 | 12.0 |
| NPP11PPN | 5.0 |
| NPP7PPN | 18.0 |
| NPP9PPN | 11.0 |
| Total | 100 |

TABLE 14 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 89.2 | 4.5 |
| FIG. 3 | 16 | TN | 86.5 | 2.4 |
| FIG. 2 | 16 | IPS | 88.3 | 2.4 |
| FIG. 1 | 20 | None | 90.2 | 4.6 |

Example 6

TABLE 15 formula of liquid crystal mixture

| Component | Ratio/% |
|---|---|
| 2PPN | 5.1 |
| 5PPN | 14.5 |
| 5OPPN | 11.2 |
| 6OPPN | 5.3 |
| 3PP$^{11}$PN | 11.2 |
| 5HPPN | 5.9 |
| 3PP$^{23}$TPO2 | 2.8 |
| R01 | 16.0 |
| NPP11PPN | 5.0 |
| NPP7PPN | 18.0 |
| NPP9PPN | 5.0 |
| Total | 100 |

TABLE 16 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.4 | 4.7 |
| FIG. 3 | 16 | TN | 86.5 | 2.3 |
| FIG. 3 | 16 | IPS | 87.3 | 2.5 |
| FIG. 1 | 20 | None | 91.5 | 5.2 |

Example 7

TABLE 17 formula of liquid crystal mixture

| Component | Ratio/% |
|---|---|
| 2PPN | 5.1 |
| 5PPN | 14.5 |
| 5OPPN | 11.2 |
| 6OPPN | 5.3 |
| 3PP$^{11}$PN | 11.2 |
| 2PP$^{11}$P4 | 2.8 |
| 5HPPN | 3.1 |
| 5PPPN | 2.8 |
| R01 | 16.0 |
| NPP11PPN | 5.0 |
| NPP7PPN | 18.0 |
| NPP9PPN | 5.0 |
| Total | 100 |

TABLE 18 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 89.5 | 4.2 |
| FIG. 3 | 16 | TN | 86.7 | 2.3 |
| FIG. 3 | 16 | IPS | 87.2 | 2.1 |
| FIG. 1 | 20 | None | 90.8 | 5.3 |

Example 8

TABLE 19 formula of liquid crystal mixture

| Component | Ratio/% |
|---|---|
| 2PPN | 5.1 |
| 5PPN | 14.5 |
| 5OPPN | 11.2 |
| 6OPPN | 5.3 |
| 3PP$^{11}$PN | 11.2 |
| 5HPPN | 2.8 |
| 2PP$^{23}$P4 | 3.1 |
| 5PPPN | 2.8 |
| R01 | 16.0 |
| NPP11PPN | 5.0 |
| NPP7PPN | 18.0 |
| NPP9PPN | 5.0 |
| Total | 100 |

TABLE 20 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.5 | 4.8 |
| FIG. 3 | 16 | TN | 88.5 | 2.0 |
| FIG. 3 | 16 | IPS | 87.9 | 1.9 |
| FIG. 1 | 20 | None | 91.6 | 4.5 |

Example 9

TABLE 21 formula of liquid crystal mixture

| Component | Ratio/% |
|---|---|
| NPP7PPN | 25.0 |
| L05 | 0.1 |
| R01 | 19.0 |
| NPPO5OPPN | 4.9 |
| 5PPN | 13.3 |
| 3PP$^{11}$PN | 10.2 |
| 6OPPN | 4.8 |
| 2PPN | 4.5 |
| 5OPPN | 10.2 |
| 5HPPN | 5.4 |
| 5PPPN | 2.6 |
| Total | 100 |

TABLE 22 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 86.7 | 2.5 |

Example 10

TABLE 23 formula of liquid crystal mixture

| Component | Ratio/% |
|---|---|
| NPP7PPN | 25.0 |
| R01 | 13.0 |
| 2PPN | 2.8 |
| 4PPN | 0.3 |
| 3OPPN | 1.2 |
| 5PPN | 24.2 |
| 5OPPN | 9.9 |
| 7PPN | 3.1 |
| 6OPPN | 2.5 |
| 8OPPN | 3.1 |
| 3PP$^{11}$PN | 6.8 |
| 5HPPN | 5.0 |
| 5PPPN | 3.1 |
| Total | 100 |

TABLE 24 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 85.7 | 9.1 |
| FIG. 3 | 16 | IPS | 80.2 | 2.3 |

Example 11

TABLE 25 formula of liquid crystal mixture

| Component | Ratio/% |
|---|---|
| NPP7PPN | 27.0 |
| R01 | 13.0 |
| 2PPN | 2.7 |
| 4PPN | 0.3 |
| 3OPPN | 1.2 |
| 5PPN | 23.4 |
| 5OPPN | 9.6 |
| 7PPN | 3.0 |
| 6OPPN | 2.4 |
| 8OPPN | 3.0 |
| 3PP$^{11}$PN | 6.6 |
| 5HPPN | 4.8 |
| 5PPPN | 3.0 |
| Total | 100 |

TABLE 26 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 88.9 | 11.8 |
| FIG. 3 | 16 | IPS | 81.7 | 2.9 |

Example 12

TABLE 27 formula of liquid crystal mixture

| Component | Ratio/% |
|---|---|
| NPP7PPN | 34.0 |
| R01 | 16.0 |
| 5PPN | 13.0 |
| 3PP$^{11}$PN | 10.0 |
| 6OPPN | 4.7 |
| 2PPN | 4.5 |
| 5OPPN | 10.0 |
| 5HPPN | 5.3 |
| 5PPPN | 2.5 |
| Total | 100 |

TABLE 28 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.7 | 6.2 |

Example 13

TABLE 29 formula of liquid crystal mixture

| Component | Ratio/% |
|---|---|
| NPP7PPN | 20.0 |
| R01 | 16.0 |
| 5PPN | 25.0 |
| 3PP$^{11}$PN | 5.0 |
| 6OPPN | 3.0 |
| 2PPN | 3.0 |
| 5OPPN | 3.0 |
| NPP5PPN | 5.0 |
| NPP9PPN | 20.0 |
| Total | 100 |

TABLE 30 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 92.4 | 14.2 |

Example 14

TABLE 31 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP$^{11}$PN | 10.8 |
| 5HPPN | 5.7 |
| 5PPPN | 2.7 |
| R01 | 12.0 |
| NPP$^{12}$7P$^{11}$PN | 5.0 |
| NPP7PPN | 18.0 |
| NPP9PPN | 11.0 |
| Total | 100 |

TABLE 32 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.5 | 5.5 |
| FIG. 3 | 16 | TN | 87.3 | 4.4 |
| FIG. 2 | 16 | IPS | 89.6 | 3.4 |
| FIG. 1 | 20 | None | 91.4 | 4.6 |

Example 15

TABLE 33 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP$^{11}$PN | 10.8 |
| 5HPPN | 5.7 |
| 5PPPN | 2.7 |
| R01 | 12.0 |
| NP$^{22}$7P7PP$^{21}$N | 5.0 |
| NPP7PPN | 18.0 |
| NPP9PPN | 11.0 |
| Total | 100 |

TABLE 34 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.6 | 5.5 |
| FIG. 3 | 16 | TN | 87.5 | 3.4 |
| FIG. 2 | 16 | IPS | 89.4 | 4.4 |
| FIG. 1 | 20 | None | 91.7 | 5.6 |

Example 16

TABLE 35 formula of liquid crystal mixture

| Component | Ratio/% |
|---|---|
| NPP7PPN | 10.0 |
| R01 | 15.9 |
| 5PPN | 20.1 |
| 3PP$^{11}$PN | 10.7 |
| 6OPPN | 5.1 |
| 2PPN | 7.1 |
| 5OPPN | 6.0 |
| 5HPPN | 3.2 |
| 5PPPN | 1.5 |
| NPP5PPN | 3.0 |
| NPP9PPN | 16.9 |
| PM001 | 0.5 |
| Total | 100 |

Where, after preparation, the light modulating device was placed under a UV light source (365 nm, 10 mw/cm$^2$) for 60 seconds to polymerize the polymerizable monomer PM001.

TABLE 36 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 86.2 | 4.5 |
| FIG. 3 | 16 | TN | 87.5 | 1.6 |

Example 17

TABLE 37 formula of liquid crystal mixture

| Component | Ratio/% |
|---|---|
| NPP7PPN | 10.0 |
| R01 | 15.9 |
| 5PPN | 20.0 |
| 3PP$^{11}$PN | 10.7 |
| 6OPPN | 5.1 |
| 2PPN | 7.0 |
| 5OPPN | 6.0 |
| 5HPPN | 3.3 |
| 5PPPN | 1.5 |
| NPP5PPN | 3.0 |
| NPP9PPN | 16.9 |
| NOA65 | 0.5 |
| Photo initiator 184 | 0.1 |
| Total | 100 |

Where, after preparation, the light modulating device was placed under a UV light source (365 nm, 10 mw/cm$^2$) for 60 seconds to polymerize the polymerizable monomer inside NOA65.

TABLE 38 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 87.8 | 1.9 |
| FIG. 3 | 16 | TN | 87.1 | 1.4 |

Example 18

TABLE 39 formula of liquid crystal mixture

| Component | Ratio/% |
|---|---|
| NPP7PPN | 15.0 |
| R01 | 16.0 |
| 5PPN | 14.0 |
| 3PP$^{11}$PN | 10.8 |
| 6OPPN | 5.1 |
| 2PPN | 4.9 |
| 5OPPN | 5.4 |
| 5HPPN | 5.7 |
| NPP9PPN | 15.0 |
| 2P$^{21}$TPP3 | 2.7 |
| 4P$^{21}$TPP3 | 5.4 |
| Total | 100 |

TABLE 40 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 88.7 | 3.7 |

Example 19

TABLE 41 formula of liquid crystal mixture

| Component | Ratio/% |
|---|---|
| NPP7PPN | 30.0 |
| R01 | 16.0 |
| 5PPN | 13.8 |
| 3PP$^{11}$PN | 10.8 |
| 6OPPN | 5.1 |
| 2PPN | 4.9 |
| 5OPPN | 10.8 |
| 5HPPN | 5.9 |
| 5PPPN | 2.7 |
| Total | 100 |

TABLE 42 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 87.8 | 1.4 |
| FIG. 1 | 15 | None | 86.9 | 1.8 |
| FIG. 1 | 20 | None | 88.1 | 3.1 |
| FIG. 3 | 20 | STN | 90.2 | 1.6 |
| FIG. 1 | 50 | None | 94.5 | 10.8 |
| FIG. 3 | 50 | STN | 92.5 | 5.2 |

Example 20

TABLE 43 formula of liquid crystal mixture

| Component | Ratio/% |
|---|---|
| 2PPN | 4.9 |
| 5PPN | 14.0 |
| 5OPPN | 10.8 |
| 6OPPN | 5.1 |
| 3PP$^{11}$PN | 10.8 |
| 5HPPN | 5.7 |
| 5PPPN | 2.7 |
| R01 | 12.0 |
| NP$^{22}$P11PP$^{21}$N | 5.0 |
| NPP7PPN | 13.0 |
| NPP9PPN | 11.0 |
| 4PP$^{11}$7P$^{12}$PN | 5.0 |
| Total | 100 |

TABLE 44 structures and performance data for the light modulating device

| Device structure | Cell gap/μm | Alignment layer | Haze in the light scattering state/% | Haze in the transparent state/% |
|---|---|---|---|---|
| FIG. 1 | 16 | None | 90.7 | 5.4 |
| FIG. 3 | 16 | TN | 87.2 | 3.4 |
| FIG. 2 | 16 | IPS | 89.4 | 3.8 |
| FIG. 1 | 20 | None | 91.2 | 5.2 |

From the above examples and comparative example, it is demonstrated that the light modulating device containing the liquid crystal mixture of the present invention has a significantly low haze in the transparent state and an ultra-high haze in the light scattering state, thereby providing high light transmittance while keeping sufficient privacy and isolation.

In addition, for the purpose of concise illustration, the drawings herein are described in terms of a substantially planar form. However, it should be understood by those skilled in the art that the rearview mirror (and all of its functional layers) of the present invention may also include concave and convex curved surfaces, such as cylinders, spheres, ellipsoids, parabolas, or their combination. In addition, it will be appreciated by those skilled in the art that the rearview mirror of the present invention may also be applied to a combined rearview mirror system which has two or more different mirrors with different reflection directions or curvature characteristics.

While several particular exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

INDUSTRIAL APPLICABILITY

The liquid crystal mixture of the present invention can be applied to the field of liquid crystal.

The invention claimed is:

1. A liquid crystal mixture applied in light modulating devices, comprising:
   (a) at least two compounds selected from the group consisting of compounds of formulas I-1 to I-8, and I-10

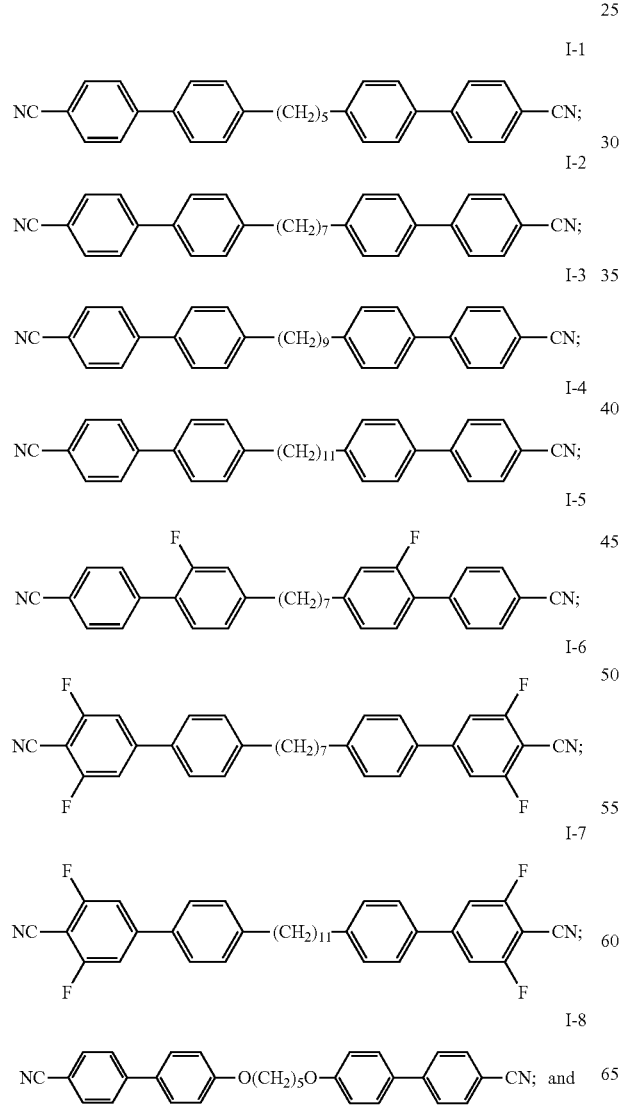

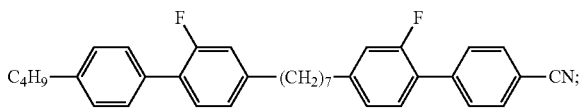

(b) at least one compound selected from the group consisting of compounds of formula II $$A_1 - (H_1)_k H_2 - A_2; \qquad II$$

(c) at least one compound selected from the group consisting of compounds of formula III $$A_3 - (H_3 - B_1)_m (H_4 - B_2)_n (H_5)_o A_4; \qquad III$$

and (d) at least one chiral compound consisting of:

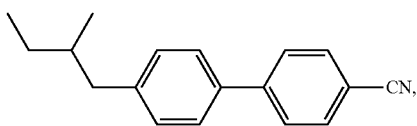

wherein
$H_1$, $H_2$, $H_3$, $H_4$ and $H_5$ each independently denote a ring structure selected from the group of

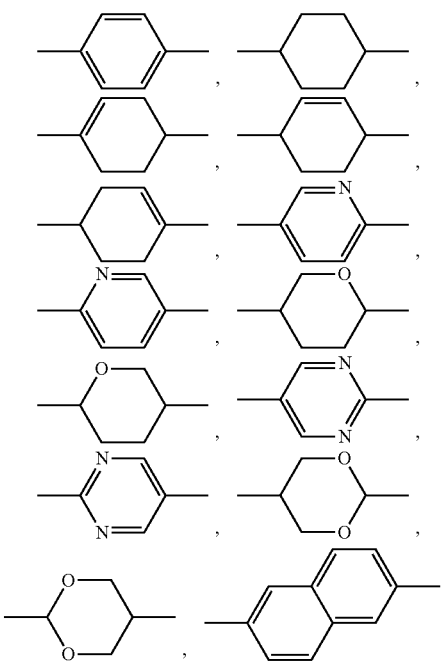

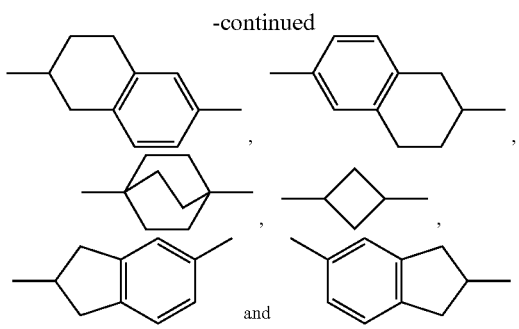

where one or more H atoms may be independently substituted by halogen, a alkyl group with 1-10 C atoms or a ester group, B$_1$ and B$_2$ each independently denote —COO—, —OCO—, —CF$_2$O—, —OCF$_2$—, —CH$_2$O—, —OCH$_2$—, —C≡C—, —CH=CH—, —CF$_2$CF$_2$—, —CF=CF—, a single bond or —(CH$_2$)$_a$— where a is a even number between 2-10, A$_1$, A$_2$, A$_3$ and A$_4$ each independently denote —CN, —F, —Cl, —NCS, —OCF$_3$, —CF$_3$ or a chain alkyl group with 1-25 C atoms where one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF— or —C≡C—, k is 1, 2, 3 or 4, m is 0, 1 or 2, n is 1, 2 or 3, o is 1 or 2, and m+n+o is no more than 5, and the at least two compounds of formulas I-1 to I-8, and I-10 is 1%-34% by weight of the liquid crystal mixture.

2. The liquid crystal mixture as defined in claim 1, further comprising at least one polymerizable monomer.

3. The liquid crystal mixture as defined in claim 2, further comprising at least one polymerization initiator.

4. The liquid crystal mixture as defined in claim 1, wherein the at least two compound of formulas I-1 to I-8, and I-10 is 10%-34% by weight of the liquid crystal mixture.

5. A light modulating device comprising the liquid crystal mixture as defined in claim 1, including two stable states: the transparent state where substantially all the incident light goes through and the light scattering state where substantially all the incident light is scattered, wherein the transparent state and the light scattering state may be switched by applying electrical field.

6. The light modulating device as defined in claim 5, wherein the haze of the transparent state is no more than 15%.

7. The light modulating device as defined in claim 5, wherein the haze of the light scattering state is no less than 80%.

* * * * *